United States Patent [19]
Nicoll

[11] 3,803,510
[45] Apr. 9, 1974

[54] ELECTRON-BEAM PUMPED LASER WITH EXTENDED LIFE
[75] Inventor: Frederick Hermes Nicoll, Princeton, N.J.
[73] Assignee: RCA Corporation, New York, N.Y.
[22] Filed: Sept. 27, 1972
[21] Appl. No.: 292,521

[52] U.S. Cl. ............... 331/94.5, 313/80, 313/336, 330/4.3
[51] Int. Cl. ........................... H01s 3/09, H01s 3/02
[58] Field of Search ......... 313/80, 336; 178/DIG. 2; 331/94.5; 330/4.3

[56] References Cited
UNITED STATES PATENTS
3,626,142   12/1971   King.............................. 219/121 EB
3,303,401   2/1967   Naumann et al. ............... 317/262 A OTHER PUBLICATIONS
Basov et al., Soviet–Physics Doklady 9, (4), Oct. 1964, p. 288.
LAX, Solid State Design, March 1965, pp. 19–23.

Primary Examiner—Ronald L. Wibert
Assistant Examiner—R. J. Webster
Attorney, Agent, or Firm—Glenn H. Bruestle; Donald S. Cohen

[57] ABSTRACT
An electron-beam pumped semiconductor laser with an extended life is provided by scanning the electron-beam over a relatively large portion of the surface of the laser element and thereby preventing a localized burn-out of the laser element.

10 Claims, 8 Drawing Figures

PATENTED APR 9 1974

3,803,510

SHEET 1 OF 4

ELECTRON-BEAM PUMPED LASER WITH EXTENDED LIFE

BACKGROUND

Electron-beam pumped lasing of numerous III-V and II-VI semiconductor materials has been demonstrated in recent years. Some of these, e.g., CdS, lase at room temperature under pulsed conditions at voltages as low as 5kV. The main requirement is to provide an optical cavity and to have sufficient current density to provide population inversion in the material. The current density required is $\approx 5$ A/cm$^2$, and if the area is small the power requirements are correspondingly small.

Present electron-beam pumped lasers require a hot cathode and various focusing and control electrodes. The final result is a rather long and large structure and a not too efficient utilization of beam current. In addition, heater power is not negligible.

Recent developments in point field emitters have shown that the necessary current density is available from such cold cathodes. In order to provide the current density at the laser crystal, it must be the anode of the device and be located very close ($\approx$ mils) to the point emitter. This close spacing prevents the electrons from spreading before exciting the crystal. At the present time in order to obtain lasing in such a device, it would be necessary to pulse the voltage to give low duty cycle operation to avoid overheating the device.

The life of an electron-beam pumped laser at room temperature has been found to be about $10^5$ pulses of 50–100 nsec duration. Even at 60 Hz repetition rate this is only about 1,000 seconds life.

SUMMARY OF INVENTION

An electron-beam pumped laser which comprises a semiconductor laser element, a cathode electrode having a point emitting tip adjacent to the surface of the laser element, and means for moving the cathode so as to displace the point emitting tip along the surface of the laser element.

DETAILED DESCRIPTION

Figure 1:
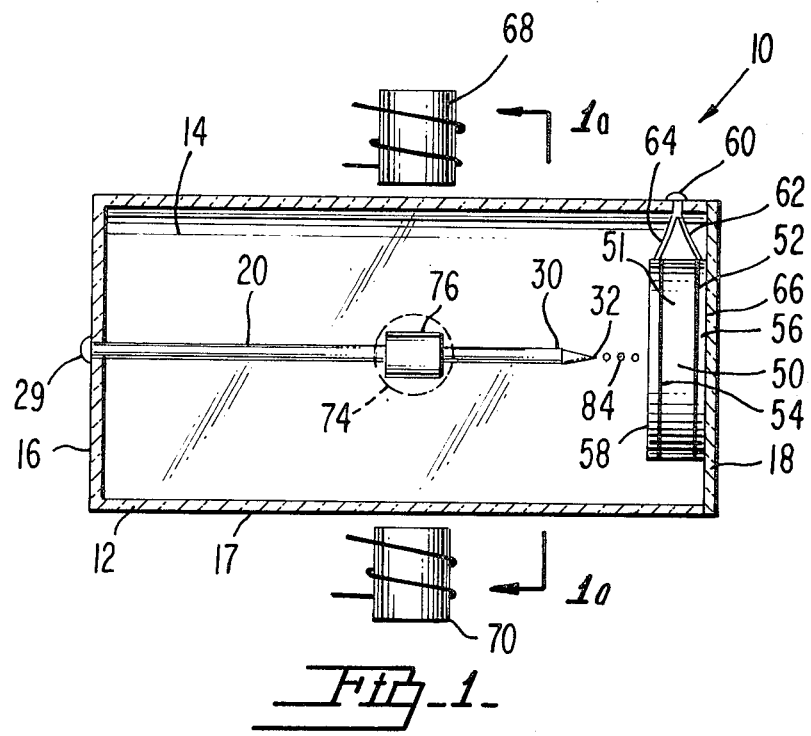
FIG. 1 is a sectional view of one form of electron-beam pumped laser of the present invention.
Figure 1A:
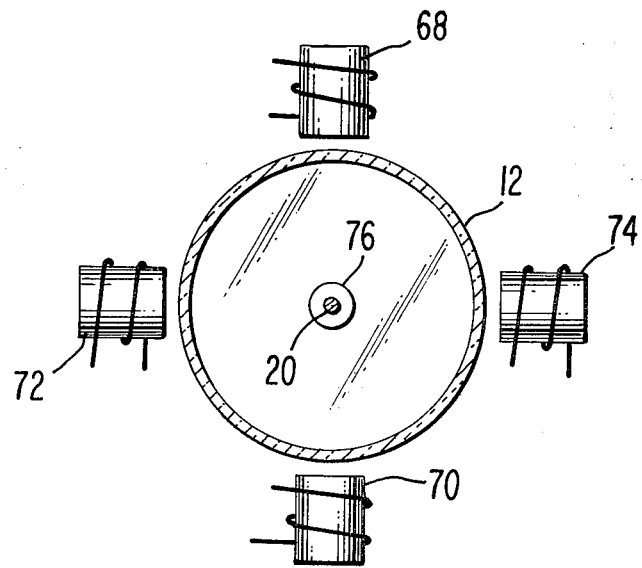
FIG. 1a is a cross-sectional view of FIG. 1 taken along line 1a—1a of FIG. 1.

Referring to FIGS. 1 and 1a, one embodiment of an electron-beam pumped laser 10 of the present invention is shown. The laser 10 includes an envelope 12 enclosing a vacuum chamber 14 having a back wall 16, a side wall 17, and a face plate 18. An electrically conductive support member 20 enters the vacuum chamber 14 through the back wall 16 of the envelope 12. At one end of the support member 20 is a cathode electrode 30 having an electron-emitting tip 32 closely spaced to a laser element 50 in the form of an optical cavity. At the other end of the support member 20 and exterior to the back wall 16 of the envelope 12 is a cathode connection 29.

The laser element 50 comprises a semiconductor crystal 51 such as a crystal of cadmium sulfide having two opposed surfaces including an beam absorbing surface 54 and an opposed light emitting end 52. There may be deposited on the light-emitting end 52 a layer of aluminum or other reflective material which will form a partial mirrow 56. This partial mirror 56 may be deposited by any well-known technique such as by vacuum evaporation and may typically be 600 A thick. On the beam absorbing surface 54, a high reflectivity mirror 58 may be deposited. The high reflectivity mirror 58 may be a layer of aluminum deposited by any well-known technique such as by vacuum evaporation and may typically be 1,000 A thick.

The electron-emitting tip 32 is spaced closely to the high reflectivity mirror 58 covering the beam absorbing surface 54 and may typically be 10 mils from the energy pumping surface 54.

The partial mirror 56 and the total mirror 58 may be electrically connected to an anode 60 via wires 62, 64.

The laser element 50 with its associated partial mirror 56 and high reflectivity mirror 58 is preferably attached to the inside surface 66 of the face plate 18. The face plate 18 may be fabricated of a material such as sapphire which will allow for the transmission of light as well as the conduction of heat away from the laser element 50 to the outside of the envelope 12.

Outside of the envelope 12 are positioning magnets 68, 70, 72, 74 which may be electromagnets. These positioning magnets 68, 70, 72, 74 are radially displaced with respect to a piece of magnetic material 76 which is attached radially to the support member 20.

The support member 20 may be a length of flexible wire having spring-like characteristics. The length of the support member 20, its cross section, and its stiffness are chosen to be consistent with the strength of the positioning magnets 68, 70, 72, 74 and the size and shape of the piece of magnetic material 76 mounted upon the support member 20.

In operation, a voltage supply is connected between the anode 60 and the cathode connection 29 causing an electron beam 84 to be projected onto the beam-absorbing surface 54 of the laser element 50. The high energy of the electron beam 84, which might typically be on the order of 15 Kev, allows it to pass through the high reflectivity mirror 58 with only small losses. The electromagnetic positioning magnets 68, 70, 72, 74 may be supplied with voltages of differing magnitude and phase in order to direct the movement of the piece of magnetic material 76, thereby moving support member 20 holding the cathode electrode 30 and the electron-emitting tip 32. This will have the effect of scanning the electron beam 84 emitted from the electron-emitting tip 32 over a relatively large area of the beam absorbing surface 54 of the semiconductor crystal 51.

This movement of the electron beam 84 over the beam absorbing surface 54 of the semiconductor crystal 51 will prevent localized burnout of the semiconductor crystal 51. The present invention will extend the life of an electron-beam pumped laser 10 considerably by virtue of the considerable increase in area used for lasing purposes. In many cases, the fact that lasing occurs in various parts of the semiconductor crystal 51 is immaterial since it is mainly the coherence, narrow beam, and the narrow emission wavelength that are important for practical uses.

In general, the present invention is not limited to magnetic deflection of the electron-emitting tip 32. Other means for producing movement of the electron-emitting tip 32 may be used in order to scan the electron beam 84 over the beam absorbing surface 54 of the semiconductor crystal 51. When means other than electromagnetic are used, the electron-beam pumped laser 10 as shown in FIGS. 1 and 1a will operate as previously described. However, changes will have to be made in the type of support member being used and in the method for producing movement in the support member.

Figure 2:
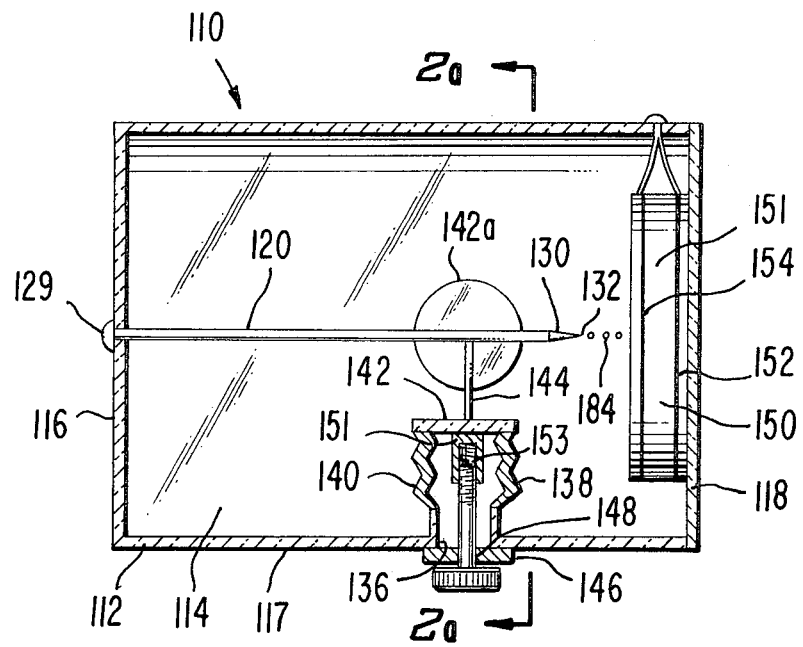
FIG. 2 is a sectional view of another form of the present invention showing mechanical means for imparting movement upon the support member.
Figure 2A:
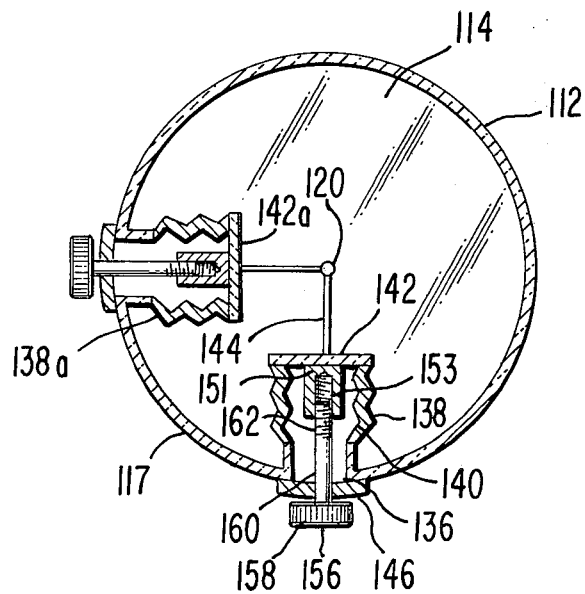
FIG. 2a is a cross-sectional view of FIG. 2 taken along line 2a—2a of FIG. 2.

For example, in FIGS. 2 and 2a a mechanical embodiment of an electron-beam pumped laser 110 of the present invention is shown. The laser 110 includes an envelope 112 enclosing a vacuum chamber 114 and having a back wall 116, a side wall 117, and a face plate 118. An adjustable support member 120 enters the vacuum chamber 114 through the back wall 116 of the envelope 112. At one end of the support member 120 is a cathode electrode 130 having an electron-emitting tip 132 closely spaced to a laser element 150 comprised of a semiconductor crystal 151 having an beam absorbing surface 154 and a light-emitting end 152. A cathode connection 129 is mounted upon the back wall 116 of the envelope 112 and is electrically connected to the cathode electrode 130.

In this embodiment, an aperture 136 is defined in the side wall 117 of the envelope 112. An air-tight bellows structure 138 is used to couple mechanical movement exterior to the vacuum chamber 114 to the support member 120. The bellows structure 138 comprises an expandable bellows wall 140 and a moveable vacuum-containing wall 142. The vacuum-containing wall 142 is made of a non-flexible material and is affixed in an air-tight manner to the expandable bellows wall 140. The expandable bellows wall 140 is likewise affixed in an air-tight manner to the aperture 136 in the side wall 117 of the envelope 112. The bellows structure 138 allows the vacuum-containing wall 142 to be moved readily inwardly and outwardly. On the inside of the envelope 112 and affixed to the vacuum-containing wall 142 is a support brace 144. The support brace 144 is also connected to the flexible support member 120 and is used to couple movements of the vacuum-containing wall 142 to the support member 120. Covering the aperture 136 is a support plate 146 which contains a hole 148. On the outside of the vacuum chamber 114 and on the inside of the bellows structure 138 and affixed to the vacuum-containing wall 142 is a sleeve 151 having a threaded inside wall 153. An adjustment screw 156 which comprises a knurled knob 158, a smooth shaft 160, and a threaded shaft 162 is passed through the hole 148 in the support plate 146 and screwably mounted in the sleeve 151 so that the threaded shaft 162 screwably engages the threaded inside wall 153 of the sleeve 151. A second bellows structure 138a may be used to couple mechanical movement to the support member 120 in a plane different from that of the first bellows structure 138. The parts and operating characteristics of the second bellows structure 138a correspond to those of the first bellows structure 138, so no further explanation will be necessary.

In operation, the atmospheric pressure exterior to the vacuum chamber 114 will force the vacuum-containing wall 142 to be moved radially inward extending the bellows wall 140 inwardly. The knurled knob 158 will be forced into contact with the support plate 146 which will restrain the inward movement of the vacuum-containing wall 142. The position of support member 120 may be readily adjusted by turning adjustment screw 156. In this manner, the position of support member 120 together with its associated cathode electrode 130 and electron-emitting tip 132 may be adjusted by turning knurled knob 158. As has already been discussed, movement of the electron-emitting tip 132 will cause the scanning of the electron beam 184 over the energy pumping surface 154 of the semiconductor crystal 151.

Figure 3:
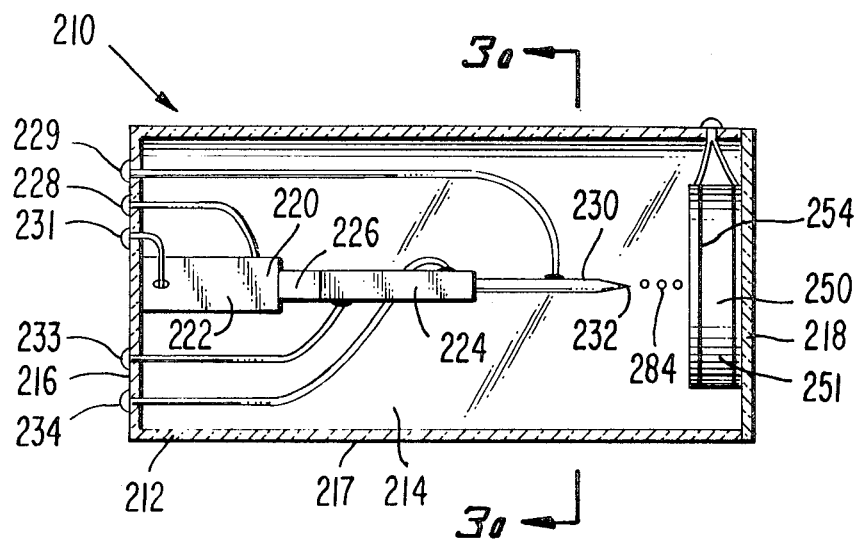
FIG. 3 is a sectional of another form of the present invention showing piezoelectric means for imparting movement upon the support member.
Figure 3A:
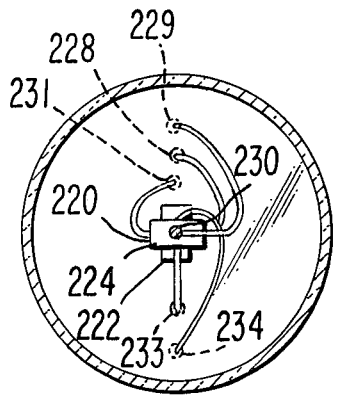
FIG. 3a is a cross-sectional view of FIG. 3 taken along line 3a—3a of FIG. 3.

Referring generally to FIGS. 3 and 3a, a piezoelectric embodiment of an electron-beam pumped laser 210 is shown. The laser 210 includes an envelope 212, enclosing a vacuum chamber 214 and having a back wall 216, a side wall 217, and a face plate 218. A support member 220 is mounted in the vacuum chamber 214 on the back wall 216 of the envelope 212. On the end of the support member 220 is a cathode electrode 230 having an electron-emitting tip 232 closely spaced to a laser element 250 comprised of a semiconductor crystal 251 having an beam absorbing surface 254. A cathode connection 229 is mounted upon the back wall 216 of the envelope 212 and is electrically connected to the cathode electrode 230. Support member 220 is comprised to two piezoelectric reeds 222, 224 which are connected by connecting brace 226. A first pair of electrodes 228, 231 is electrically connected to the first piezoelectric reed 222 and a second pair of electrodes 233, 234 is electrically connected to the second piezoelectric reed 224 which comprise support member 220. The piezoelectric reeds 222, 224 are made of a piezoelectric material such as quartz, rochelle salt, tourmaline or a titanate material which have the property of bending upon application of an electrical potential upon their electrodes. The first piezoelectric reed 222 is oriented such that upon application of an electric potential to its electrodes 228, 231 it will be deflected inwardly or outwardly and the second piezoelectric reed 224 is oriented such that upon application of an electric potential to its electrodes 233, 234 it will be deflected upwardly or downwardly with respect to the plane of the drawing shown in FIG. 3.

With particular reference to FIG. 3a, support member 220 will be deflected to the left or to the right upon application of an electric potential to the first set of electrodes 228, 231 of the first piezoelectric reed 222 and the support member 220 will be deflected upwardly or downwardly upon application of an electric potential to the electrodes 233, 234 of the second piezoelectric reed 224.

In operation, if voltages are impressed upon electrodes 228, 231, 233, 234, the support member 220 together with its cathode electrode 230 and electron-emitting tip 232 will be displaced. The displacement of the electron-emitting tip 232 will cause scanning of the electron beam 284 over the beam absorbing surface 254 of the semiconductor crystal 251.

Figure 4:
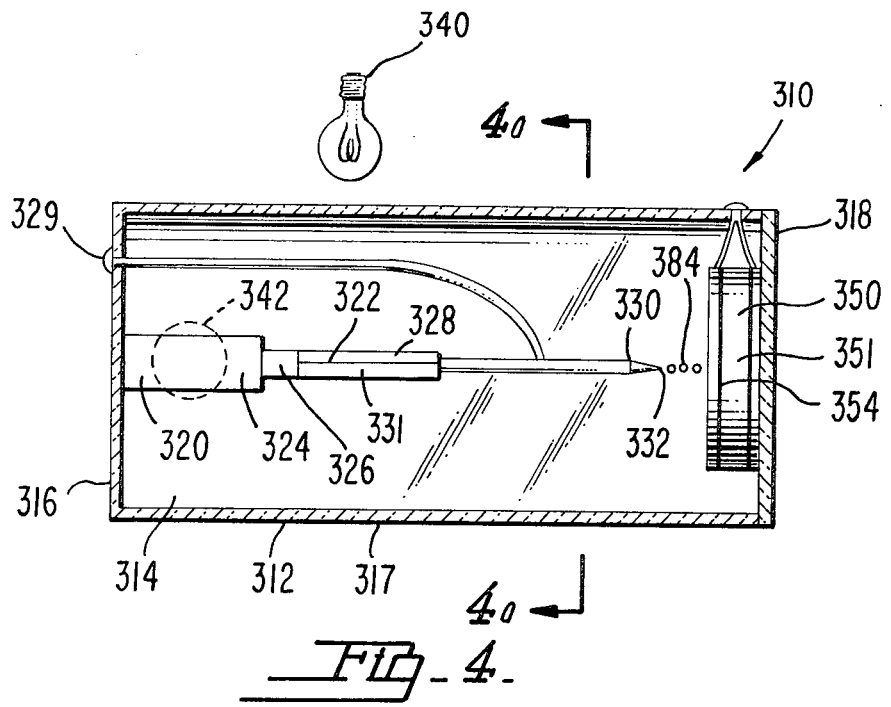
FIG. 4 is a sectional view of another form of the present invention showing a bi-metallic means for imparting movement upon the support member.
Figure 4A:
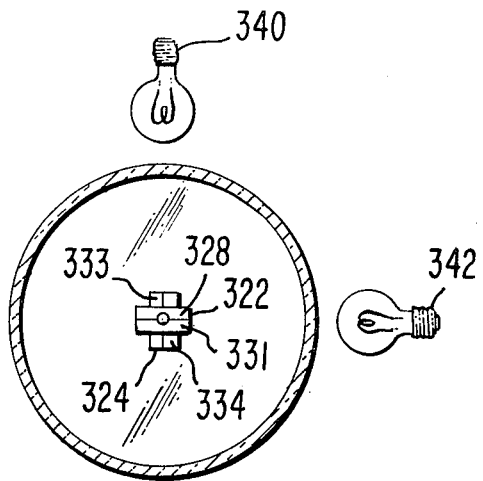
FIG. 4a is a cross-sectional view of FIG. 4 taken along line 4a—4a of FIG. 4.

Referring generally to FIGS. 4 and 4a, a bimetallic embodiment of an electron-beam pumped laser 310 is shown. The laser 310 includes an envelope 312 enclosing a vacuum chamber 314 and having a back wall 316, a side wall 317 and a face plate 318. A support member 320 is mounted in the vacuum chamber 314 on the back wall 316 of the envelope 312. On the end of the support member 320 is a cathode electrode 330 having an electron-emitting tip 332 closely spaced to a laser element 350 comprised of a semiconductor crystal 351 having an beam absorbing surface 354. A cathode connection 329 is mounted on the back wall 316 of the envelope 312 and is electrically connected to the cathode electrode 330.

Support member 320 is comprised of two bimetallic strips 322, 324 which are connected by connecting brace 326. The first bimetallic strip 322 is comprised of two metals having dissimilar coefficients of thermal expansion such as invar 328 and brass 331, and the second bimetallic strip 324 is likewise comprised of two metals having dissimilar coefficients of thermal expansion such as invar 333 and brass 334. The bimetallic strips 322, 324 have the property of bending upon application of heat upon either or both of the dissimilar metals 328, 331, 333, 334, which comprise them and this property of bimetallic strips is generally known and understood. The first bimetallic strip 322 is oriented such that upon application of heat which may be applied radiantly from a radiant heat source 340 located exterior to the envelope 312, it will be deflected upwardly. If radiant heat source 340 is turned off after the application of radiant heat to the first bimetallic strip 322, the first bimetallic strip 322 will be deflected downwardly as it cools. Similarly, a radiant heat source 342 may be used to deflect the second bimetallic strip 324 inwardly and outwardly with respect to the plane of the drawing shown in FIG. 4.

With particular reference to FIG. 4a, support member 320 will be deflected upwardly upon application of radiant heat to the pair of dissimilar metals 328, 331 which comprise the first bimetallic strip 322 and the support member 320 will be deflected to the left upon the application of radiant heat to the pair of dissimilar metals 333, 334 which comprise the second bimetallic strip 324.

In operation, if radiant heat sources 340, 342 are used to supply radiant heat to the bimetallic strips 322, 324, the support member 320 together with its cathode electrode 330 and electron-emitting tip 332 will be displaced. The displacement of the electron-emitting tip 332 will cause scanning of the electron beam 384 over the beam absorbing surface 354 of the semiconductor crystal 351.

I claim:

1. An electron-beam pumped laser comprising:
    a. a semiconductor laser element in the form of an optical resonant cavity and having a beam absorbing surface,
    b. a flexible support member fixed at one end and free at the other end,
    c. a cathode electrode having an electron-emitting tip mounted on the free end of said support member adjacent said beam absorbing surface, and
    d. means for moving said support member so as to move cathode electrode along said beam absorbing surface of said semiconductor laser element to prevent burnouts.

2. An electron-beam pumped laser in accordance with claim 1 in which a piece of magnetic material is on said support member, and including magnetic means to move said piece of magnetic material whereby said cathode electrode is also moved.

3. An electron-beam pumped laser in accordance with claim 1 including means for mechanically moving said support whereby said cathode electrode is also moved.

4. An electron-beam pumped laser in accordance with claim 1 in which said support member includes at least one piezoelectric reed and including electric means for energizing said piezoelectric reed to move said piezoelectric reed whereby said cathode electrode is also moved.

5. An electron-beam pumped laser in accordance with claim 1 in which said support member includes at least one bimetallic strip and including heat means to move said bimetallic strip whereby said cathode electrode is also moved.

6. An electron-beam pumped laser in accordance with claim 1 in which the semiconductor laser element and the cathode electrode are enclosed within an envelope containing a vacuum chamber.

7. An electron-beam pumped laser in accordance with claim 6 in which said means for moving said cathode electrode comprises:
    a. a piece of magnetic material mounted upon said flexible support member,
    b. magnetic means radially mounted with respect to said piece of magnetic material and external to said envelope.

8. An electron-beam pumped laser in accordance with claim 6 in which said means for moving said cathode electrode comprises an air-tight bellows structure.

9. An electron-beam pumped laser in accordance with claim 6 in which said support member includes at least one piezoelectric reed and said means for moving said cathode electrode comprises means for applying an electric potential across said piezoelectric reed.

10. An electron-beam pumped laser in accordance with claim 6 in which said support member includes at least one bimetallic strip and said means for moving said cathode electrode comprises means for applying radiant heat upon said bimetallic strip.

* * * * *